Nov. 12, 1963   E. C. MILLER   3,110,272
SLAG TAP FURNACE
Filed March 14, 1961   3 Sheets-Sheet 1

MAIN CONTROL

EARLE C. MILLER
INVENTOR.

BY Norman S. Blodgett
ATTORNEY

Nov. 12, 1963   E. C. MILLER   3,110,272
SLAG TAP FURNACE

Filed March 14, 1961   3 Sheets-Sheet 2

EARLE C. MILLER
INVENTOR

BY
ATTORNEY

Nov. 12, 1963 E. C. MILLER 3,110,272
SLAG TAP FURNACE

Filed March 14, 1961 3 Sheets-Sheet 3

EARLE C. MILLER
INVENTOR

BY
ATTORNEY

3,110,272
SLAG TAP FURNACE
Earle C. Miller, Worcester, Mass., assignor to Riley Stoker Corporation, Worcester, Mass., a corporation of Massachusetts
Filed Mar. 14, 1961, Ser. No. 95,600
3 Claims. (Cl. 110—28)

This invention relates to a slag tap furnace and more particularly to an apparatus arranged to produce steam by burning pulverized solid fuels in suspension and by burning other types of fuel.

In the operation of steam generating units, the fuel, particularly pulverized solid fuel, is burned with a residue of molten slag. This slag, for the most part, is incombustible material in the coal and, when the furnace is operated at a relatively high temperature, this slag remains molten and runs down into the bottom of the furnace. Some furnaces were designed so that the slag runs continuously from an opening in the furnace bottom, and these are called "continuous tap" units. Other furnaces are operated in such a way that the slag accumulates in a pool in the bottom of the furnace and is removed from the furnace intermittently; this type of furnace is called "intermittent tap" unit. As a general rule, the former type of furnace has an opening in the center of the bottom and a dam surrounding the hole, the dam and opening being cooled by water-containing tubing. In order to permit the flow of slag from the furnace, it is, of course, necessary to maintain the pool in a molten condition. In the past, when slag tap furnaces were operated at full load where the furnace temperature was quite high, there has been no difficulty in maintaining the pool in a molten condition. However, difficulties have arisen when the furnace was operated at low load. When it was attempted to fire the furnace at a lower rating, the temperature of the furnace was not high enough to maintain the pool in a molten condition and, in going from a high load to a low load, the molten slag became more and more viscous so that, when the low load was finally reached, the slag was in a hard unmolten condition and clogged the tap hole. In order to start the furnace up again and to continue to tap molten slag at high load, it was necessary to lance out the slag opening, a very difficult task. Furthermore, when it was necessary to replace the water-cooled tubing or refractory in the slag tap hole, the accumulation of slag around and in the hole due to this above-described procedure made the job very difficult and caused the "downtime" of the unit to be extremely long. These and other difficulties experienced with the prior art devices of this type have been obviated in a novel manner by the present invention.

It is, therefore, an outstanding object of this invention to provide a slag tap furnace in which low load operation is possible without difficulty with undesirable accumulation of slag.

Another object of this invention is the provision of a slag tap furnace capable of operation at low load without accumulation of slag or clogging of the slag tap hole.

A further object of the present invention is the provision of a slag tap furnace in which the furnace can be shut down for maintenance of the slag hole without difficulty due to the accumulation of slag in and around the hole.

It is another object of the instant invention to provide a slag tap furnace which will permit operation at low load without clogging of the slag tap hole and which will permit maintenance of the slag tap hole without difficulty due to accumulation of slag.

It is a further object of the invention to provide a furnace burner particularly adapted for effective operation in a slag tap furnace.

A still further object of this invention is the provision of a slag tap furnace which is capable of operation on occasion as a dry bottom furnace and with which no difficulty is experienced in returning to the slag tap type of operation.

With these and other objects in view, as will be apparent to those skilled in the art, the invention resides in the combination of parts set forth in the specification and covered by the claims appended hereto.

The character of the invention, however, may be best understood by reference to one of its structural forms, as illustrated by the accompanying drawings in which.

In the specification which follows, the expressions "longitudinal," "transverse" and the like, refer to those directions as applied to a steam generating unit in the ordinary practices of that art, and in general, refer to the flow of gas through the unit.

Figure 1:
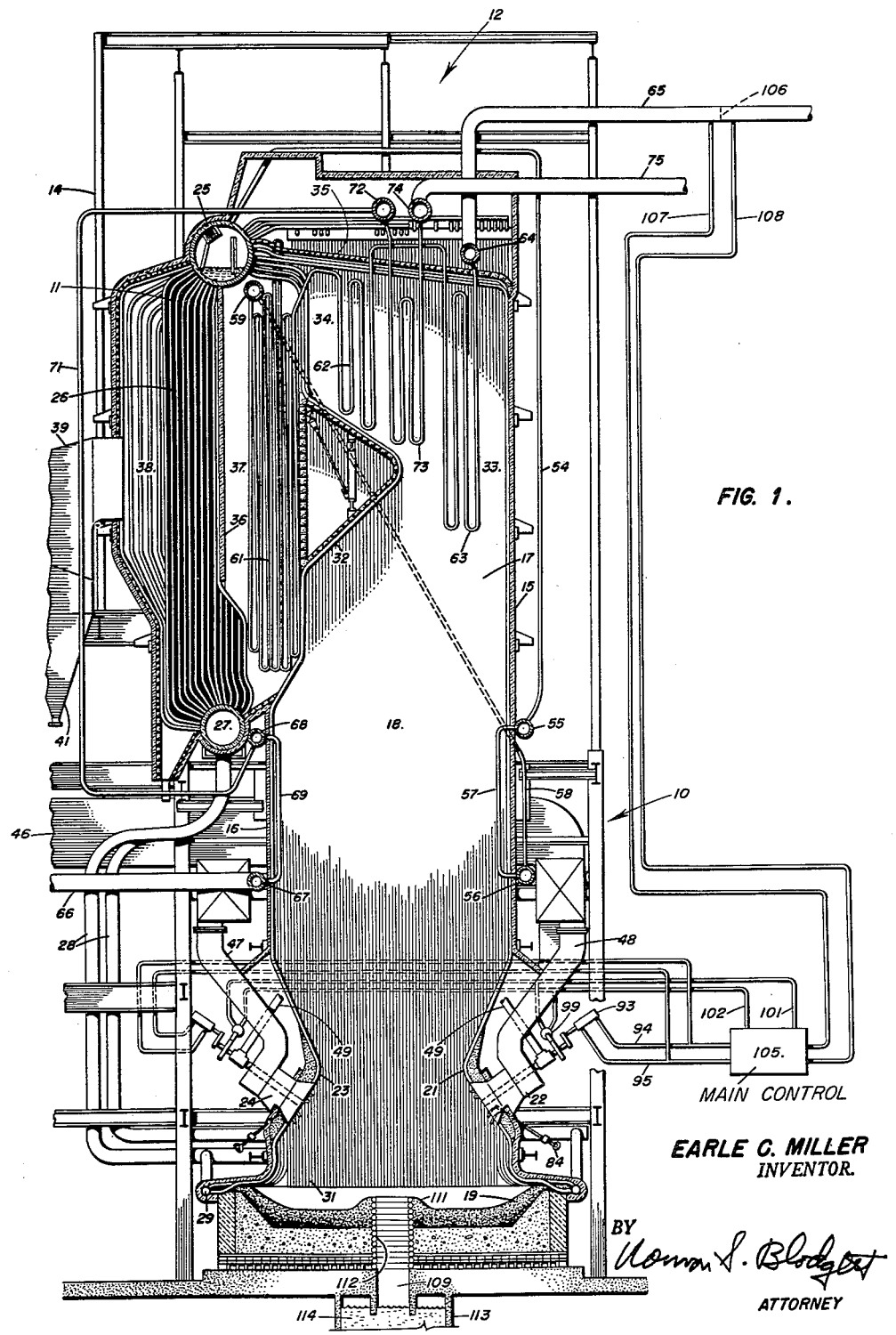
FIG. 1 is a vertical sectional view of a steam generating unit embodying the principles of the present invention.

Referring first to FIG. 1, wherein is best shown the general features of the invention, the furnace, indicated generally by the reference numeral 10, is shown in use with a boiler 11. The boiler and furnace make up a steam generating unit 12 and they are mounted on a supporting structure 14. The furnace 10 consists of a forward wall 15 and a rearward wall 16 which, with two side walls 17, define a combustion chamber 18. Underlying the combustion chamber is a slag basin 19 formed of refractory material. The forward wall 15 is provided with a nose 21 located in its lower portion directly overlying the slag basin 19 and provided with a burner 22. A similar nose 23 is provided in the rearward wall 16 and a burner 24 is mounted on the downwardly-directed surface of the nose.

The boiler 11 consists of an upper steam-and-water drum 25 joined by downcomer tubes 26 to a lower drum 27, both drums extending transversely of the unit. Large downcomer pipes 28 extend from the lower drum 27 to a header 29 extending around the periphery of the slag basin 19. Water-wall tubes 31 extend upwardly from the header 29 along the forward wall 15, the rearward wall 16, and the side walls 17; these water-wall tubes are connected at the upper part of the furnace to the steam-and-water drum 25. A nose 32 extends forwardly of the furnace at the upper part of the rear wall 16 and provides a restricted passage 33 between the most forward portion of the nose and the forward wall 15. The nose 32 also serves to define an upper pass 34 between its upper surface and a roof 35 of the furnace. A refractory wall 36 extends downwardly from the steam-and-water drum 25 and serves to divide the rearward portion of the unit into back passes 37 and 38. A duct 39 leads from the back pass 38 to a dust collector 41 which, in turn, is connected through an air heater (not shown) to an induced draft fan (not shown) and a breaching leading in the usual manner to a stack (not shown). A first draft fan (not shown) is connected through the air heater to a duct 46 having ducts 47 and 48 leading to the burners 24 and 22, respectively. Pipes 49 lead from the output of a pulverizer to the burners 22 and 24.

The steam-and-water drum 25 is provided with a separator of the usual type and tubes 54 lead from the upper part of the steam-and-water drum through a header 55 arranged beside the forward wall 15 of the furnace. Below the header 55 is arranged another header 56 of a similar type. Joining these headers and lying within the furnace against the forward wall 15 are radiant superheater tubes 58 which lead from the header 56 to a header 59 which is connected to a convection superheater 62 lying in the upper pass 34. The output of the superheater 62 is connected to superheater platens 63 hanging downwardly from the roof 35 to the restricted passage 33 in the upper part of the combustion chamber. The output of the platens 63 is connected to a superheater steam header 64 which, in turn, is connected by a high pressure pipe 65 to a turbine (not shown). The output of the high pressure section of the turbine is connected through the pipe 66 to a header 67 arranged adjacent the rearward wall 16 of the furnace. A similar header 68 is mounted above the header 67 and the two are joined by a radiant reheater 69 which lies closely adjacent the inner surface of the rearward wall 16. The header 68 is connected by a pipe 71 to an input header 72 connected to one end of a convection reheater 73 lying in the upper pass 34 between the superheater 62 and the superheater platen 63. The output of the reheater 73 is connected to a reheater steam header 74 which, in turn, is connected by means of a high pressure pipe 75 to a low pressure section of the turbine.

Figure 2:
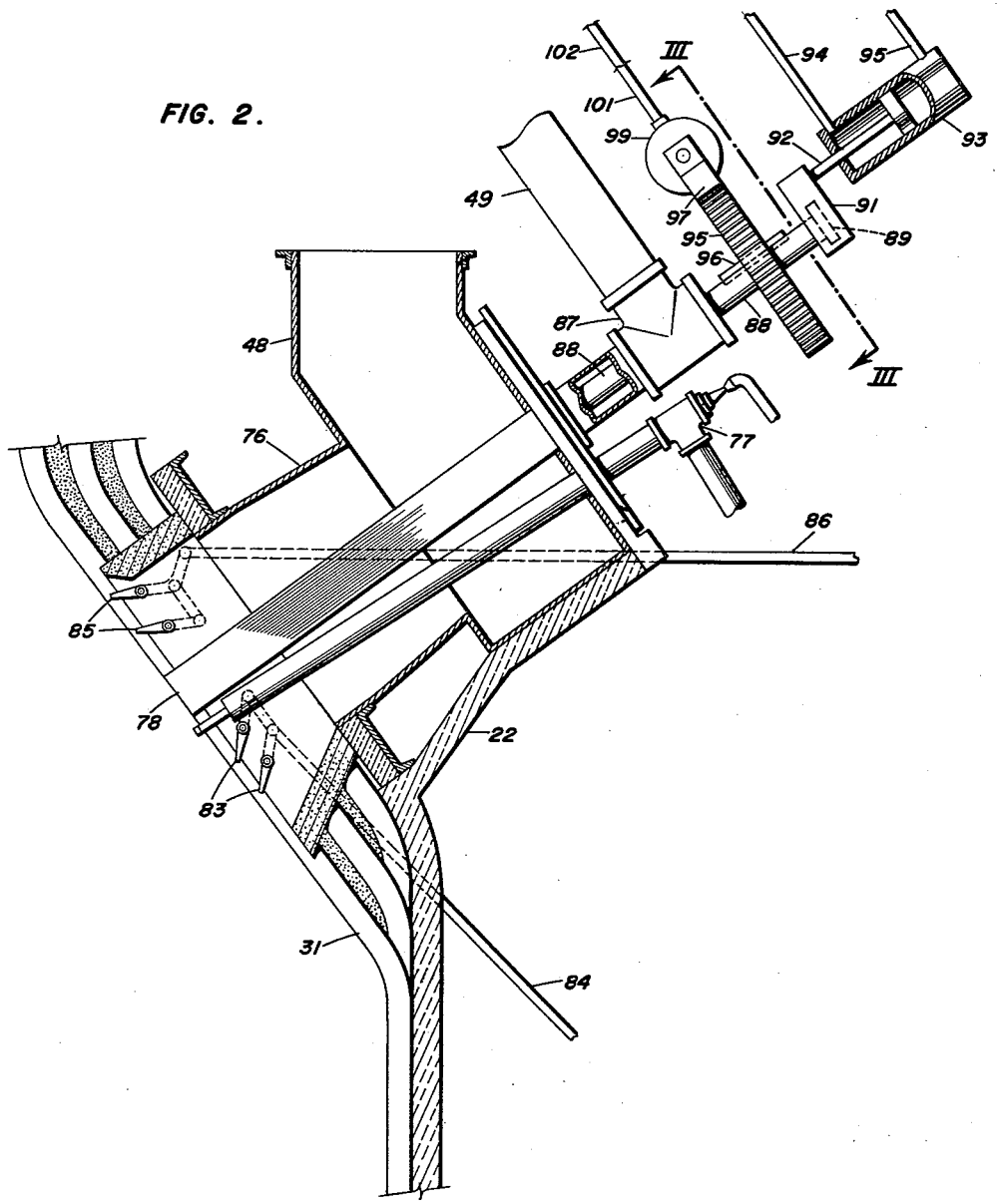
FIG. 2 is an enlarged view of the portion of the apparatus shown in FIG. 1.
Figure 3:
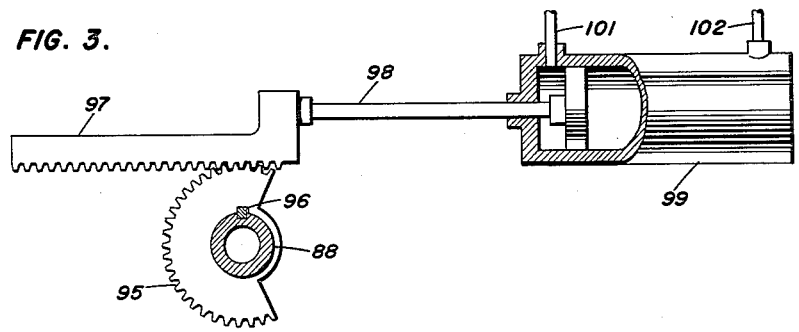
FIG. 3 is a sectional view of the invention taken on the line III—III of FIG. 2.

Referring next to FIGS. 2 and 3, which show the details of the burner 22, it can be seen that the air duct 48 is connected to a housing 76. Centrally of the housing is located a continuous spark igniter 77 and a gun 78 for introducing pulverized coal into the burner. The conduit 49 leading from the pulverizer is connected to the gun. As is evident in FIG. 2, some of the water-wall tubes 31 are bent rearwardly in the vicinity of the burner 22 to form passages for the flow of fuel and air. At the front of the burner below the gun 78 are located pivoted vanes 83 which are connected through a mechanical linkage to an actuating rod 84. In the upper part of the burner are located pivoted vanes 85 which are connected through a mechanical linkage to an actuating rod 86. The burner 24 is similarly provided with a fuel gun and upper and lower vanes whose angularity is adjusted by means of an actuating rod. The gun 78 where it emerges from the rear of the housing 76 is connected by a T-fitting 87 to the pipe 49. Lying within the gun is an actuating tube 88 which emerges from the outer side of the fitting 87 with a seal (not shown) extending between the two in such a manner that the tube 88 is capable of sliding or rotating reltive to the fitting without permitting leakage of primary air and fuel to the exterior of the apparatus. Formed at the outer end of the actuating tube 88 is an enlarged head 89 and fastened around this head is a block 91; the block is attached to the head 89 and to the tube 88 in such a manner that the tube can rotate relative to the block without moving the block, but the block is capable of longitudinal movement and the tube moves with it when such a movement takes place. The block 91 is connected to the piston rod 92 of a hydraulic linear actuator 93. A hydraulic line 94 is connected to one end of the actuator 93 and a hydraulic line 95 is connected to the other end of the actuator. Fastened to the central portion of the tube 88 between the fitting 87 and the head 89 is a gear segment 95. The tube passes through a bore in the segment and a key 96 permits the tube 88 to move longitudinally relative to the segment 95 at the same time permitting the segment to rotate the tube. The segment is engaged by a rack 97 which is attached to the outer end of the piston rod 98 of a hydraulic linear actuator 99. A hydraulic line 101 extends from one end of the actuator, while a line 102 extends from the other end of the actuator.

Figure 4:
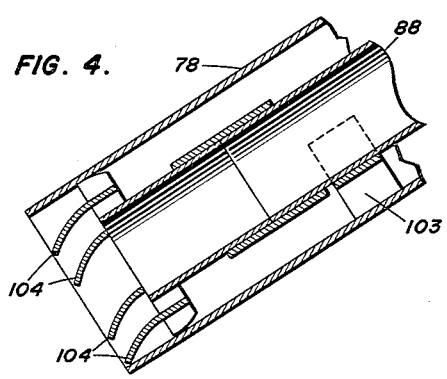
FIGS. 4, 5, and 6 show the condition of portions of the apparatus of FIG. 2 during various stages of operation.

FIG. 4 shows the internal construction of the gun 78. The actuating tube 88 is supported concentrically of the gun 78 by a curved support 103 welded to the interior of the gun. At its forward end the tube 88 is provided with a series of vanes 104 which are curved and bent as shown in FIG. 4 in such a way that the primary air and fuel are directed downwardly in the furnace.

Referring again to FIG. 1, the linear actuator 93 associated with the burner 22 and a similar actuator associated with the burner 24 are connected by the lines 94 and 95 to a main control 105. In a similar manner the linear actuator 99 of the burner 22 and a similar actuator associated with the burner 24 is connected by the lines 101 and 102 to the main control 105. A load indicator 106, consisting of an orifice, for measuring steam flow in the superheated steam pipes 65, is connected by lines 107 and 108 to the main control 105; the lines 107 and 108 are located before and after the orifice of the load indicator 106 to indicate the pressure drop across the orifice and, consequently, the steam flow and load on the unit. This signal is introduced into the main control 105. The main control 105 is of a well-known type performing the function of receiving pressure signals and converting them to hydraulic signals in such a way as to perform certain operations with the hydraulic signals in the lines 94 and 95 and 101 and 102, as will be described hereinafter. It should also be noted in connection with FIG. 1 that the slag basin 19 is provided with a slag tap hole 109 having a raised dam 111 extending around its upper edge. A coil of water-cooling tubes 112 extends upwardly into the dam and lines the sides of the wall. The lower end of the hole extends downwardly into a slag disposing unit 113 which usually consists of a pool of water 114 and associated equipment.

The operation of the apparatus of the invention may now be readily understood in view of the above description. Fuel is mixed with a small amount of primary air and passes through the pulverizer (not shown) where it is comminuted. The pulverized fuel and primary air passes through the pipes 49 to the fuel guns 78 of the burners 22 and 24. The pulverized fuel and primary air are projected into the combustion chamber 18 in the general direction of the slag basin 19 when the vanes 104 are arranged in the manner shown in FIG. 4. Air enters the unit through the force draft fan and, after being heated in the air heater, passes through the duct 46 into the separate ducts 47 and 48 leading to the burners 24 and 22, respectively. The air enters the burner housings and flows past the pivoted vanes 83 and 85 into the furnace; this secondary air is controlled by these vanes and this combines with the fuel coming from the fuel gun 78 forming a mass of burning fuel and air in the portion of the combustion chamber which underlies the noses 21 and 23. Ignition is maintained by the continuous spark igniter 77. It is the nature of this particular design of furnace that combustion takes place almost completely below the horizontal line defined by the innermost points on the noses 21 and 23; gases pass from this lower portion of the furnace upwardly through the combustion chamber 18 and leave the chamber through the restricted passage 33 and the upper pass 34. Eventually the gas passes over the superheater 63, the convection reheater 73, and the convection superheater 74. As the gases pass upwardly through the combustion chamber 18, the radiant superheater 57 and the radiant reheater 69 receive heat by radiation. The gases then pass downwardly through the back pass 37 over the convection superheater 61 and upwardly through the back pass 38; they then pass through the duct 39, the dust collector 41 and pass outwardly to the stack.

Feed water enters the boiler in the lower part of the steam-and-water drum 25 and passes downwardly therefrom through the downcomer tubes 26 to the drum 27. Some of the water arriving there passes downwardly through the downcomer tubes 28 to the header 29 and then flows upwardly through the water-wall tubes 31 where it is converted into steam, which steam passes into the steam-and-water drum 35 and is purified. Purified steam passes out of the drum through the pipe 54 into the header 55, passes through the radiant superheater 57 into the header 56 and then goes upwardly through the tube 58 to the convection superheater 61. The steam then passes through the convection superheater 62 in the upper pass 34 and from there into the superheater platens 63 to the superheater steam header 64. At that point the steam passes through the pipes 65 into the turbine, its flow being measured by the load indicator 106 as it passes through the pipe to the turbine. After expansion through the high-pressure section of the turbine, the steam is returned for reheating through the pipe 66 to the header 67 and from there through the radiant reheater 69 to the header 68. Reheat steam then passes through the pipes 71 to the input header 72. The reheat steam passes through the convection heater 73 to the reheated steam header 74. After that, the steam passes through the pipes 75 to the low-pressure section of the turbine.

Figure 5:
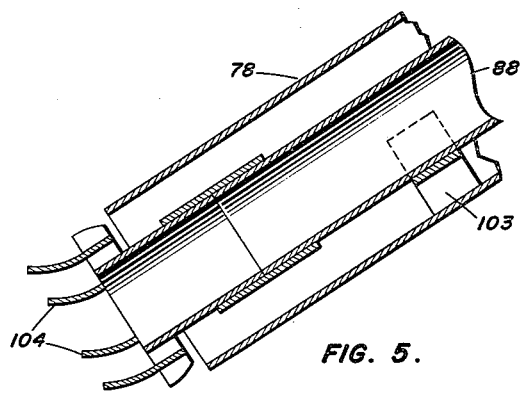
Figure 6:
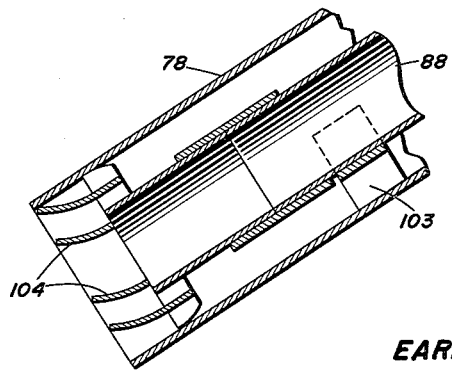

With the vanes 104 in the position shown in FIG. 4 and the vanes 83 and 85 in the position shown in FIG. 2, the furnace and the burners are in the condition normally used for high load operation of the steam generating unit. At that time, the slag formed from combustion runs down the sides of the furnace or falls through the air into the slag basin 19 where a pool accumulates. Eventually the depth of the pool reaches a valve determined by the dam 111 and overflows through the hole 109 into the slag disposal unit 114. This overflow takes place continuously and damage to the refractory is prevented by the cooling provided by the tubes 112. Because of the high temperature present below the level of the noses 21 and 23, there is no difficulty with the free running action of the slag. If, however, this temperature is reduced slowly, as is common practice in reducing the load on a steam generating unit, then the slag becomes progressively more viscous but continues to flow through the slag tap hole 109. As it becomes thicker and flows more slowly it coats the walls of the hole, and before it is completely frozen will clog the hole as well as form a mound over the dam 111. In order to prevent this action, it is the contention of the applicant that it is only necessary to reduce the temperature of the lower part of the furnace very rapidly causing a complete and almost instantaneous freezing of the slag in the basin. In that way, a minimum amount of slag will be present in the hole 109 at the time that freezing of the slag takes place. In order to accomplish this, the main control 105 constantly surveys the load on the unit; when the load is reduced, this is indicated by the load indicator 106 and the pressure signal received through the line 107 and 108 indicates to the main control that the load has been substantially lowered. It then sends hydraulic signals to the linear actuators 93 and 99 to change the condition of the burners 22 and 24. When a drop in load is indicated to the main control 105, the control causes a signal to pass through the lines 94 and 95, so as to move the piston rod 92 toward the furnace. This carries the block 91 and presses the actuating tube 88 forwardly so that the tube slides over its support 103 to the condition shown in FIG. 5 with the vanes 104 residing outside of the gun 78. The main control 105 then sends a signal through the line 101 and 102 causing the piston rod 98 of the actuator 99 to move inwardly and carry the rack 97 with it. The engagement of the rack with the segment 95 causes a rotation of the segment and, therefore, a rotation of the actuating tube 88. The tube is moved through 180° until the vanes 104 are moved to the position shown in FIG. 5 where they point in a generally upward direction. The main control 105 then sends a signal through the lines 94 and 95 to reverse the linear actuator 93 and cause the piston rod 92 to move outwardly carrying the block 91 and the actuating tube 88 with it. The tube moves inwardly of the gun 78 until the vanes 104 are well within the gun 78 and are in the condition shown in FIG. 6. It can be seen that the tube 88 may be moved longitudinally by the actuator 93 without disturbing the sector 95; on the other hand, the actuator 99 can rotate the tube 88 without disturbing the block 91 and the actuator 93. This cycle of operation, of course, is reversed in the main control 105 to return the vanes and the burner to the condition shown in FIG. 4 when the furnace returns to high load operation. However, with the burner gun 78 in the condition shown in FIG. 6, the primary air and fuel is directed upwardly in the furnace. This lowers the temperature in the cell below the noses 21 and 23 very rapidly and instantaneously congeals and freezes the slag in the basin. Because of the fact that only a short while before the slag has been running freely through the hole 109, the slag in the basin freezes and leaves very little coating or accumulation on any of the critical surfaces such as the dam 111 and the hole 109. If the furnace is operated at low load for a considerable period of time, the slag accumulates in the form of a dry dust and lumps in the slag basin; when the furnace is returned to high load operation, the reversal of the vanes 104 very quickly melts the slag in the basin and causes it to flow in the usual way through the hole 109. This is true irrespective of the amount of dry slag which has accumulated during the low load operation.

If, on the other hand, the furnace load has been reduced to a complete shutdown in order to work on the dam 111 or the tubes 112 associated with the slag tap hole, the absence of frozen slag or coating on these elements when the furnace is shut down permits them to be rapidly prepared or replaced. No difficulty is experienced in bringing the furnace back to high load operation after the repairs have been completed.

In a practical application of the invention to a steam generating unit of 155,000 pounds of steam per hour full load capacity, the unit was operated for about ten days as a dry bottom unit at a load of 100,000 pounds of steam per hour. The slag and ash accumulated in the bottom to a depth of eighteen inches at the tap hole and sloped upwardly along the walls to within six inches of the bottom of the burners. The accumulation of material in the bottom could be described as crusty; it would bear the weight of a person and felt similar to coarse sand. When walking over it, a track of about one-half inch in depth was left. Below the crusty top the accumulation was harder and more compact. This accumulation was melted down and tapped out after the unit was returned to a high load operation without any noticeable problems.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A slag tap furnace, comprising front, rear, and side walls defining a vertically-elongated combustion chamber, a refractory bottom underlying the chamber, a tap hole located in the bottom, substantial abutments extending toward one another from opposed walls to define with the bottom a high-temperature cell, burners located on the under surfaces of the abutments, each burner having a fuel gun with a rectangular tubular housing and an element extending longitudinally of the housing, the element being rotatable about a longitudinal axis and being longitudinally slidable, each element having a series of directing members adapted to extend a substantial angle to the longitudinal axis and arranged in a generally rectangular pattern to fit in the rectangular tubular housing of the gun, and means for moving the element longitudinally in one direction to free the directing members of the rectangular tubular housing of the gun, for rotating the element alternately to direct the members downwardly toward the tap hole or upwardly away from the tap hole and for moving the element longitudinally in the other direction to return the directing members to the housing of the gun.

2. A slag tap furnace, comprising front, rear, and side walls defining a vertically-elongated combustion chamber, a refractory bottom underlying the chamber, a tap hole located in the bottom, substantial abutments extending toward one another from opposed walls to define with the bottom a high-temperature cell, burners located on the under surfaces of the abutments, each burner having a fuel gun with a rectangular tubular housing and an element extending longitudinally of the housing, the element being rotatable about a longitudinal axis and longitudinally slidable, each element having a series of directing members adapted to extend a substantial angle to the longitudinal axis and arranged in a generally rectangular pattern to fit in the rectangular tubular housing of the gun, load means including changes in load on the furnace, a main control connected to the load means, and actuating means connected to the main control for moving the element longitudinally in one direction to free the directing members of the rectangular tubular housing of the gun, for rotating the element alternately to direct the members downwardly toward the tap hole at high load for continuous tapping of the slag or upwardly away from the tap hole for dry bottom operation, and for moving the elements longitudinally in the other direction to return the directing members to the housing of the gun.

3. A slag tap furnace, comprising front, rear, and side walls defining a vertically-elongated combustion chamber, a refractory bottom underlying the chamber, a tap hole located in the bottom, substantial abutments extending toward one another from opposed walls to define with the bottom a high-temperature cell, burners located on the undersurfaces of the abutments, each burner having a fuel gun with a tubular housing and an element extending longitudinally of the housing, the element being rotatable about a longitudinal axis and being longitudinally slidable, each element having a series of directing members adapted to extend at a substantial angle to the longitudinal axis and arranged in a pattern to fit in the tubular housing of the gun, and means for moving the element longitudinally in one direction to free the directing members of the tubular housing for rotating the element alternately to direct the members downwardly toward the tap hole or upwardly away from the tap hole and for moving the element longitudinally in the other direction, to return the directing members to the housing of the gun.

References Cited in the file of this patent

UNITED STATES PATENTS

| | | |
|---|---|---|
| 1,955,574 | Benner et al. | Apr. 17, 1934 |
| 1,994,446 | Hardgrove | Mar. 12, 1935 |
| 2,058,051 | Bailey | Oct. 20, 1936 |
| 2,363,875 | Kreisinger et al. | Nov. 28, 1944 |
| 2,608,168 | Jackson | Aug. 26, 1952 |
| 2,782,738 | Zoller | Feb. 26, 1957 |
| 2,800,888 | Miller et al. | July 30, 1957 |
| 2,853,059 | Craig | Sept. 23, 1958 |
| 2,895,435 | Bogot et al. | July 21, 1959 |
| 2,947,289 | Miller | Aug. 2, 1960 |